FIG. 4.

INVENTOR.
WORTHY J. F. FORWARD
WILLIAM R. MILLER, JR.
BY
ATTORNEY

United States Patent Office 2,766,651
Patented Oct. 16, 1956

2,766,651

MACHINE TOOL WITH SEPARATE WORK AND FEED DRIVES

Worthy J. F. Forward, Rochester, and William R. Miller, Jr., Brighton, N. Y., assignors, by mesne assignments, to Farrel-Birmingham Company Incorporated, Ansonia, Conn., a corporation of Connecticut Application April 4, 1951, Serial No. 219,144

5 Claims. (Cl. 82—2)

The present invention relates to machine tools, and more particularly to lathes, boring mills and similar machines in which a cutting operation is performed by rotating, or otherwise traversing the work past a cutting tool while effecting feed of the tool relative to the work. In one aspect the invention relates more specifically to a machine tool of the type disclosed in the U. S. patent of Alfred Trosch and Worthy J. F. Forward, No. 2,546,913, granted March 27, 1951.

In lathes, boring mills and similar machines, change gears are incorporated in the drive to the work to permit changing the speed of rotation of the work spindle or of the face plate of the machine for cutting different materials. Likewise, change gears are provided to vary the rate of feed of the tool into the work. A different rate of cut is employed when cutting a cast iron blank, for instance, from that used for cutting a steel workpiece; and a tungsten carbide tool, for example, will take a different thickness of cut, that is, should be fed at a different rate from, and the work would be rotated at a higher speed than, where an ordinary high-speed steel cutting tool is employed. Also, if the same tool, or tools having identical cutting characteristics, is or are employed, the rate of feed of the tool should be changed when the speed of rotation of the work is decelerated; otherwise, the tool may be forced to cut too thick a chip and be broken.

In the conventional lathe or boring mill, the work spindle has a continuous geared connection with the means for effecting feed of the tool relative to the work. Hence, in the conventional lathe or boring mill when the speed of rotation of the work is changed, the drive to the tool carriage or tool slide is simultaneously affected and in the correct proportion, being automatically speeded up or slowed down, depending on whether the work spindle has been speeded up or slowed down, and through the same change gears which have effected change in speed of the work rotation. Accordingly in the conventional lathe or boring mill the tool will continue to feed at the proper rate into the work and to cut a chip of the proper thickness regardless of whether the speed of rotation of the work spindle is accelerated or decelerated.

In machines like that of the Trosch and Forward patent above mentioned, however, the feed mechanism may be driven independently of the work even though operating simultaneously with the rotation of the work. Thus, in the lathe illustrated in said patent, the work spindle is geared to the feed mechanism only for threading operations, but for facing, turning, or boring the feed mechanism is driven by a train of gearing, which is independent of the train of gearing which drives the work spindle, and which is driven by a motor separate from the motor which drives the work spindle. Moreover, in such a machine both the work spindle and the feed mechanism may be driven by variable speed motors.

Heretofore it has devolved upon the operator of a machine, in which the feed mechanism is driven independently of the work, to see to it, when he changes the speed of work rotation, either by varying the speed of the motor that drives the work, or by shifting change gears in the drive from that motor to the work spindle, or by a combination of both, that he also changes his rate of feed of the tool and in the proper proportion. Experience has shown, however, that sometimes the operator neglects to make the required change in rate of feed of the tool, when changing the speed of rotation of the work, with the result that a tool is broken, or damage is done to the work or to the machine. This may be very costly where the tool is expensive and requires replacement, or where the machine has to be shut down for any length of time to effect change of the tool, or where the work or machine is severely damaged.

A primary object of the present invention is to provide means, particularly for a machine tool in which the work spindle may be driven independently of the feed mechanism, for insuring that when a change in speed of rotation of the work is made a suitable corresponding change will be made in rate of feed of the tool.

Another object of the invention is to provide in a machine tool a mechanism which will automatically shift the change gears governing the rate of feed of the tool when the change gears, which control the rate of speed of the work rotation, are shifted.

Another object of the invention is to provide a machine tool in which the work is driven separately from the feed mechanism and in which, when the speed change gears in the work drive are shifted, the same ratio of shift is made in the change gears which drive the feed mechanism.

A further object of the invention is to provide in a machine tool a mechanism which will prevent shifting of the speed change gears to a lower speed without simultaneously shifting the feed change gears to a slower rate of feed.

Still another object of the invention is to provide a machine tool in which the work and the feed mechanism are driven through separate gear trains from separate variable speed motors and in which a mechanism is provided for automatically shifting feed change gears when work speed change gears are shifted, and in which the two variable speed motors are so connected together that, when a change in speed of rotation of the work is made, simultaneously a corresponding change of feed of the tool will be made and in the proper ratio.

Other objects of the invention will be apparent hereinafter from the specification and from the recital of the appended claims.

Figure 1:
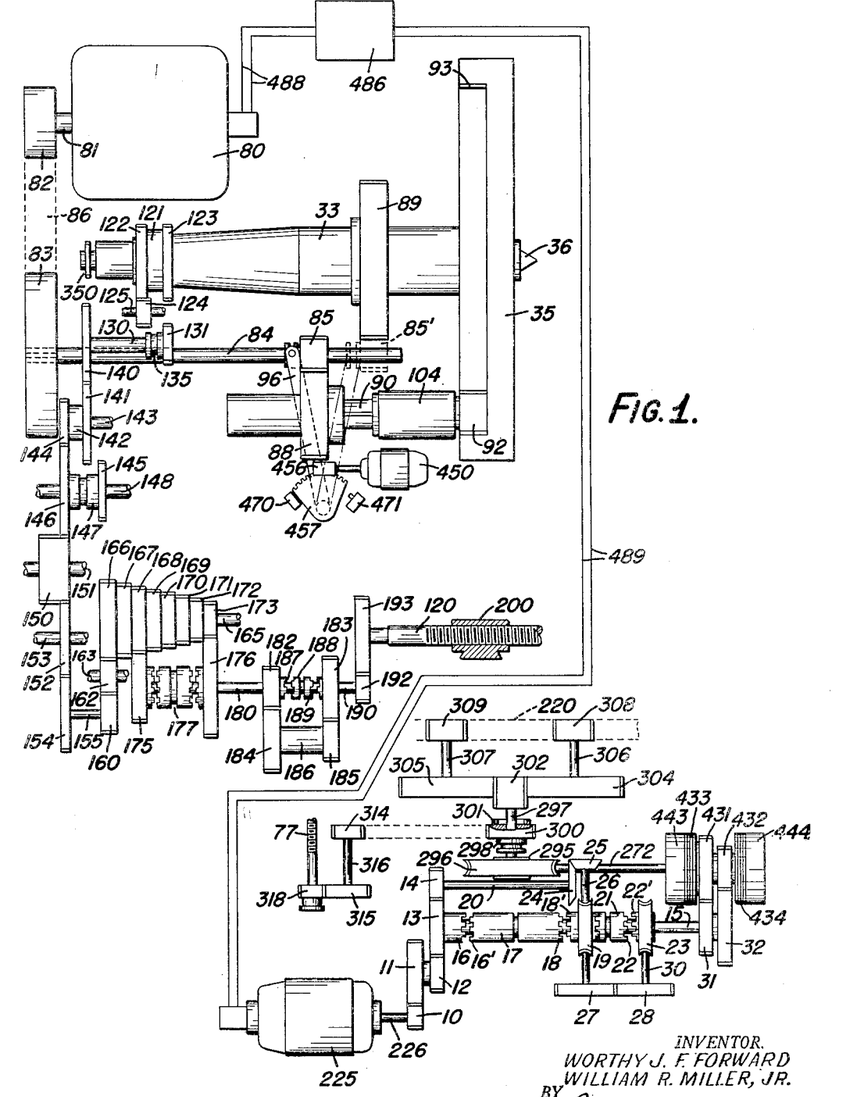
Fig. 1 is a drive diagram of a lathe built according to one embodiment of the present invention.

Referring now to the drawings by numerals of reference and first to Fig. 1, there is shown here diagrammatically the driving mechanism of a lathe similar to that disclosed in Patent No. 2,546,913 referred to above. The same reference numerals are employed herein to designate the parts of the lathe herein disclosed which are like those of the lathe illustrated in the above-mentioned patent.

33 denotes the work spindle of this lathe. Secured to this spindle in any suitable manner is the face-plate 35. The face plate is adapted to carry a plurality of chucking jaws (not shown) which grip the work so that the work will rotate with the face plate and with the work spindle between the centers of the lathe, of which one only is shown at 36.

The work spindle is adapted to be driven from a motor 80. The armature shaft 81 of this motor has a pulley 82 secured to it that drives the pulley 83 through a belt 86. The pulley 83 is keyed to a shaft 84. This shaft is splined at its inner end and has slidably mounted thereon a spur pinion 85. The pinion 85 is adapted to be shifted axially on the shaft by means of a shift lever 96 to engage the pinion 85 in driving engagement either with a spur gear 88 or with a spur gear 89. The pinion is shown in full lines in Fig. 1 in engagement with the gear 88, and in dotted lines at 85' in the position it occupies when in engagement with the gear 89.

The gear 89 is keyed or otherwise fastened to the work spindle 33. The gear 88 is keyed or otherwise suitably secured to a shaft 90 which is suitably journaled in the head stock of the lathe. The shaft 90 has a pinion 92 slidably keyed to it. This pinion is adapted to mesh with an internal gear 93 which is secured to or formed integral with the face plate 35.

In one of its positions, the pinion 85 drives the face-plate 35 and work spindle 33 through the gear 88, shaft 90, pinion 92 and internal gear 93. This is the slow speed drive to the work spindle. In its other position, the pinion 85 drives the work spindle 33 and face-plate 35 through the gear 89. This is the high speed drive to the work spindle. Thus, by shifting the pinion 85 the work can be rotated at a fast or a slow speed.

When the pinion 85 is driving the work spindle 33 through the gear 89 it is inadvisable to have the pinion 92 in mesh with the internal gear 93. The pinion 92 may be shifted out of mesh with the gear 93 by means such as described in patent No. 2,546,913, above mentioned which forms no part of the present invention.

For thread-cutting, the carriage of the lathe, which carries the tool, is moved longitudinally on the lathe bed in time with the rotation of the work spindle. This movement is effected by rotation of the lead screw 120 which is connected to the work spindle by a conventional train of gearing. This train of gearing forms no part of the present invention and therefore will only be described briefly.

Keyed to the work spindle 33 is a sleeve 121 with which are integral two equal spur gears 122 and 123. The gear 122 meshes with a spur pinion 124 which is secured to a shaft 125 that is suitably journaled in the head stock of the lathe. Keyed to a shaft 130, that is also journaled in the head stock in parallelism to the shaft 125 and work spindle 33, is a spur pinion 131. This pinion is adapted to slide axially on the shaft 130 and is adapted to be meshed selectively with either the pinion 124 or the gear 123 to drive the shaft 130 selectively in opposite directions from the spindle 33. A lever is provided at a suitable point on the machine for shifting the pinion 131.

Keyed to the shaft 130 is a spur gear 140. This meshes with a spur gear 141 that is integral with a sleeve 142 that is journaled on a shaft 143. Integral with the sleeve 142 is a second spur gear 144 which has a different number of teeth from the gear 141. The gears 141 and 144 are adapted to mesh, respectively, with gears 145 and 146. These gears are formed integral with a sleeve 147 which is keyed to a shaft 148 that is suitably journaled in the head stock of the lathe. This sleeve may be shifted axially on shaft 148 to engage the gears 145 and 146 selectively with the gears 141 and 144, respectively, to drive the shaft 148 at different speeds from the shaft 143.

The gear 146 meshes with a long faced gear 150 which rotates on a shaft 151; and this gear 150 meshes in turn with a gear 152 which rotates on a shaft 153. The gear 152 meshes with a gear 154 which is secured to a shaft 155. Also secured to the shaft 155 is a spur pinion 160. This pinion forms part of a conventional feed change gear set which can be shifted by a conventional shift lever. The pinion 160 meshes with a spur pinion 162 which is secured to a shaft 163. Keyed to a shaft 165, which is parallel to the shafts 155 and 163, are a plurality of feed change gears 166 to 173 inclusive which differ in tooth number from one another. The gears 160 and 162 are adapted to be moved axially along the shafts 155 and 163, respectively, and to be swung about the axis of shaft 155 so that the pinion 162 while remaining in mesh with gear 160 may simultaneously be engaged selectively with any of the feed change gears 166 to 173 inclusive.

The gear 168 meshes with a spur gear 175 and the spur gear 173 meshes with a spur gear 176 which is coaxial with gear 175. Between the two spur gears is a shiftable clutch sleeve 177 which is formed with face coupling teeth on its opposite ends that are adapted to be engaged selectively with complementary face coupling teeth formed on the hubs of gears 175 and 176. Hence, by shifting the sleeve 177 one or other of the gears 175 or 176 can be connected to the shaft 180 to drive that shaft from shaft 165.

Journaled on the shaft 180 are spur gears 182 and 183. The gear 182 meshes with a spur gear 184. The gear 183 meshes with a spur pinion 185. The gear 184 and pinion 185 are integral with a sleeve 186. Keyed to shaft 180 and slidable axially thereon between gears 182 and 183 is a clutch sleeve which has face clutch teeth 188 formed on one end thereof that are adapted to engage complementary face clutch teeth 187 formed on the hub of the gear 182, and which has face clutch teeth 189 at its other end which are adapted to engage complementary face clutch teeth formed on gear 183. Gear 183 is integral with a sleeve 190 that is journaled on shaft 180. When the gear 182 is coupled to shaft 180, the drive from the shaft 180 is through the gear 182, gear 184, pinion 185 and gear 183 to sleeve 190. When the gear 183 is coupled to shaft 180, however, then the shaft 180 is directly coupled to the sleeve 190. Secured to the sleeve 190 is a spur pinion 192 which meshes with a spur gear 193 that is secured to the lead screw 120.

Figure 4:
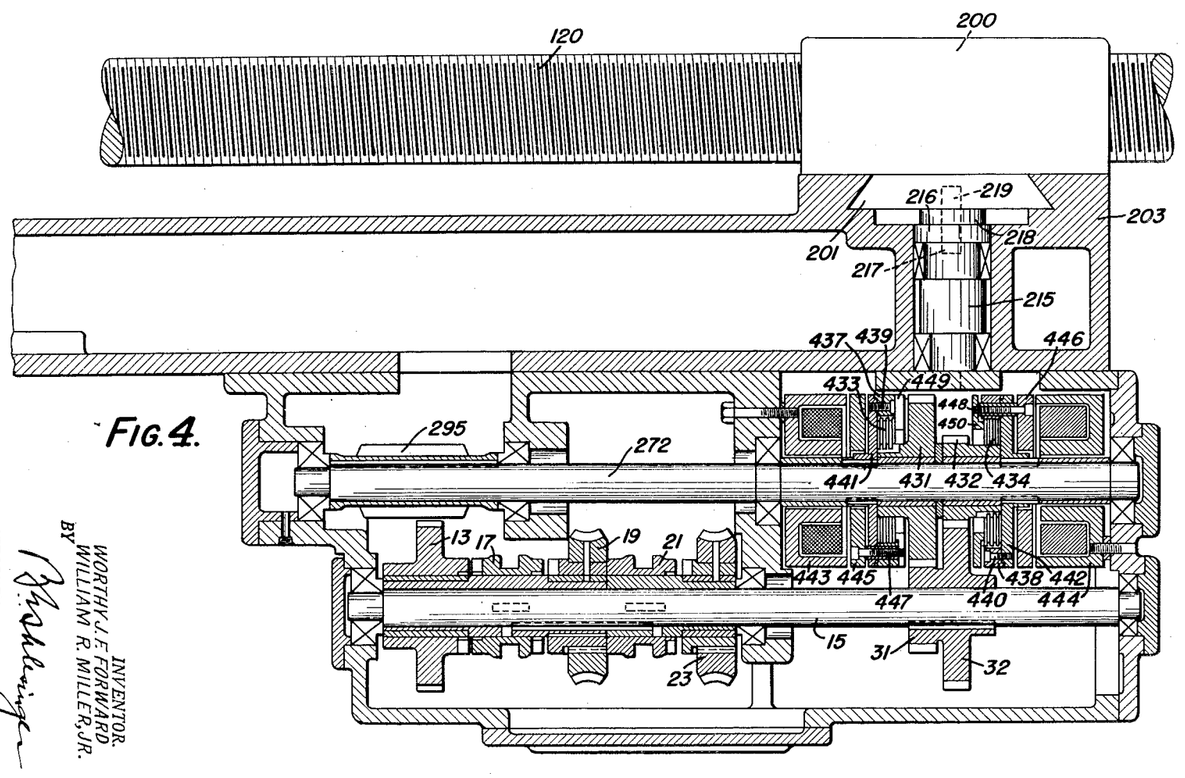
Fig. 4 is a section showing part of the drive to the tool carriage of this lathe and showing the solenoid-operated clutches for shifting the feed change gears in that part of the carriage drive which is actuated by a separate motor from the motor which drives the work spindle.

The lead screw 120 is adapted to be engaged with a conventional split nut 200 (Fig. 4) to drive the tool carriage in time with the rotation of the work spindle for a threading operation on the work. This nut may be of conventional construction. Each part of this nut may be formed, for instance, with a dove-tailed guide portion 201. These guide portions may slide in a slot or guideway formed in the apron 203 of the carriage. The split nut may be opened or closed to engage to disengage the screw 120 of rotation of a shaft 215 which has a disc 216 integral with it; and to this disc there may be connected by pins 217 link members 218 which are in turn connected by pins 219 to the dove tailed portions 201 of the split nut. Thus by rotating the shaft 125 in one direction or the other, the split nut may be opened or closed.

All this is conventional lathe structure.

The drive to the carriage for facing, turning, or boring may be similar to that of the machine of Patent No. 2,546,913, above mentioned. There is a variable speed motor 225 (Fig. 1) mounted on the apron of the carriage. The armature shaft 226 of this motor carries a spur pinion 10 which meshes with a spur gear 11 that is integral with a spur gear 12. The gear 12 meshes with a spur gear 13 which in turn meshes with a spur pinion 14. The spur gear 13 is journaled on a shaft 15 and has a hub portion integral with it that is formed with face clutch teeth 16 on one end. These teeth are adapted to be engaged with complementary face clutch teeth 16' formed on one end of a sleeve 17 which is splined or keyed to the shaft 15 and is axially slidable thereon. Sleeve member 17 has other face clutch teeth 18 formed on its opposite end which are adapted to engage with face clutch teeth 18' formed on the confronting face of the hub of a worm gear 19. This worm gear has other face clutch teeth on the opposite end of its hub portion which are adapted to engage with face clutch teeth formed on the confronting face of a slidable clutch member 21. Clutch member 21 has a sliding splined connection with shaft 15. This slidable clutch member has face clutch teeth 22 formed on its opposite end face which are adapted to engage with the face clutch teeth 22' of the hub of the worm gear 23 that is rotatably mounted on the shaft 15.

The spur pinion 14 is integral with one end of a shaft 20 which has a bevel gear 24 at its opposite end that meshes with and drives a bevel gear 25 on a shaft 26. This shaft carries a worm (not shown) which meshes with the worm wheel 19. It also carries at one end a spur gear 27 which meshes with an equal spur gear 28 that is secured to a shaft 30 which carries a worm (not shown) that meshes with the worm wheel 23.

The shaft 15 has two spur gears 31 and 32 secured to it which mesh, respectively, with spur gears 431 and 432 that are rotatably mounted upon a shaft 272.

The gears 431 and 432 are selectively couplable to the shaft 272 by disc clutches 433 (Fig. 4) and 434, respectively, which are of conventional construction and which comprise alternate discs connected to the hubs of the gears 431 and 432, respectively, and to rings 437 and 438, respectively. Rings 437 and 438 are secured by bolts 439 and 440, respectively, to discs 441 and 442, respectively, that are keyed to the shaft 272. The clutches 433 and 434 are adapted to be selectively moved to engaging position by solenoids 443 and 444, respectively. When these solenoids are energized, they attract the armature plates 445 and 446, respectively. These plates are secured by bolts 447 and 448, respectively, to pressure plates 449 and 450, respectively. The pressure plates engage the outside faces of the outermost of the friction discs of the two clutches 433 and 434, respectively.

The worm 295 meshes with a worm wheel 296 (Fig. 1) that is keyed to a shaft 297 which is suitably journaled in the apron of the carriage. The shaft 297 has a sleeve 298 mounted on it for axial sliding movement. This sleeve has an external spur gear 300 and an internal gear 301 integral with it. The internal gear 301 is adapted, in one axial position of sleeve 298, to engage a wide-faced spur pinion 302 which is journaled on the shaft 297. The external gear 300 is adapted in another position of the sleeve 298 to mesh with a pinion 314.

The pinion 302, is, as stated, a wide-faced pinion and is adapted to mesh at opposite sides with two spur gears 304 and 305 that are keyed to two parallel shafts 306 and 307, respectively. These shafts are suitably journaled in the apron of the machine. Integral with the shafts 306 and 307, respectively, are spur pinions 308 and 309, respectively, that mesh with a rack 220 at spaced points therealong. The rack 220 is fastened to the bed of the machine. When the sleeve 298 is shifted to the position where internal gear 301 meshes with spur pinion 302, then the carriage will be driven by the pinions 308 and 309 which rotate on the fixed rack 220.

The spur gear 314, with which the spur gear 300 is adapted to mesh in the other position of sleeve 298, is secured to a shaft 316 that is suitably journaled in the carriage. A gear 315 is fixed to the other end of this shaft. This gear 315 meshes with a spur gear 318 which is secured to the screw shaft 77 that effects crosswise feed of the tool. This shaft threads into a nut (not shown) that is fastened to the cross slide (not shown). When the sleeve 298 is in the position, therefore, where the spur gear 300 engages and meshes with spur gear 314, crosswise feed of the tool is effected for facing a work piece and lengthwise movement of the carriage is stopped.

The sleeve 17 (Figs. 1 and 4) is, as stated above, keyed to the shaft 15 and when it is shifted to the left from the position shown in Fig. 1, the gear 13 is clutched to this sleeve member to drive the shaft 15. When the sleeve 17 is shifted to the right from the position shown in Fig. 1, the worm wheel 19 is connected to shaft 15 by the sleeve 17 and the drive from the motor 225 to shaft 15 is through the spur gears 12, 13, 14, shaft 20, bevel gear 24, bevel gear 25, shaft 26 and the worm wheel 19. When the sleeve 21 is shifted to the right from the position shown in Fig. 1, and the sleeve 17 is in the position shown in Fig. 1, then shaft 15 is driven from the variable speed motor 225 through the gearing 10, 11, 12, 13, 14, 24, 25, 27, 28, and shaft 30 which carries the worm that meshes with the worm wheel 23. It will be seen, therefore, that by shifting the sleeves 17 and 21 the shaft 15 can be driven from the motor 225 selectively at any one of three different speeds.

The change gears 31–431 and 32–432 provide a further control over the rate of feed movement of both the carriage and the cross slide. When the solenoid 443 is energized, the drive to the shaft 272 is through the spur gears 31 and 431. This is the slow speed drive to the shaft. When the solenoid 444 is energized, the drive to the shaft 272 is through the gears 32 and 432. This is the high speed drive to the shaft. Preferably the ratio of change in the feed drive gears that is the ratio of the drive through gears 31, 431 and the drive through gears 32, 432 should be the ratio of change in the work spindle drive, that is, the ratio of the drive through gears 85, 88, 92, 93 and the drive through gears 85, 89.

As previously stated, mechanism is provided in the machine of the present invention which automatically shifts the feed from fast to slow rate when the work spindle drive gearing is shifted from fast to slow speed.

For shifting the pinion 85 in the drive to the work spindle a motor 450 (Figs. 1 and 2) may be provided. This motor may be mounted at any convenient point on the machine. Its armature shaft is connected to a shaft 451 that is suitably journaled in a housing 452. This shaft has integral with it a spur pinion 453. The pinion 453 meshes with a spur gear 454 which is keyed to a shaft 455 to which there is keyed a worm 456. This worm meshes with a worm wheel segment 457 that is keyed to a shaft 458 which extends at right angles to the shafts 451 and 455. The shaft 458 has the lever 96, which shifts pinion 85 (Fig. 1), rigidly connected to it at its opposite end.

Figures 2, 3, 6, 7, 8:
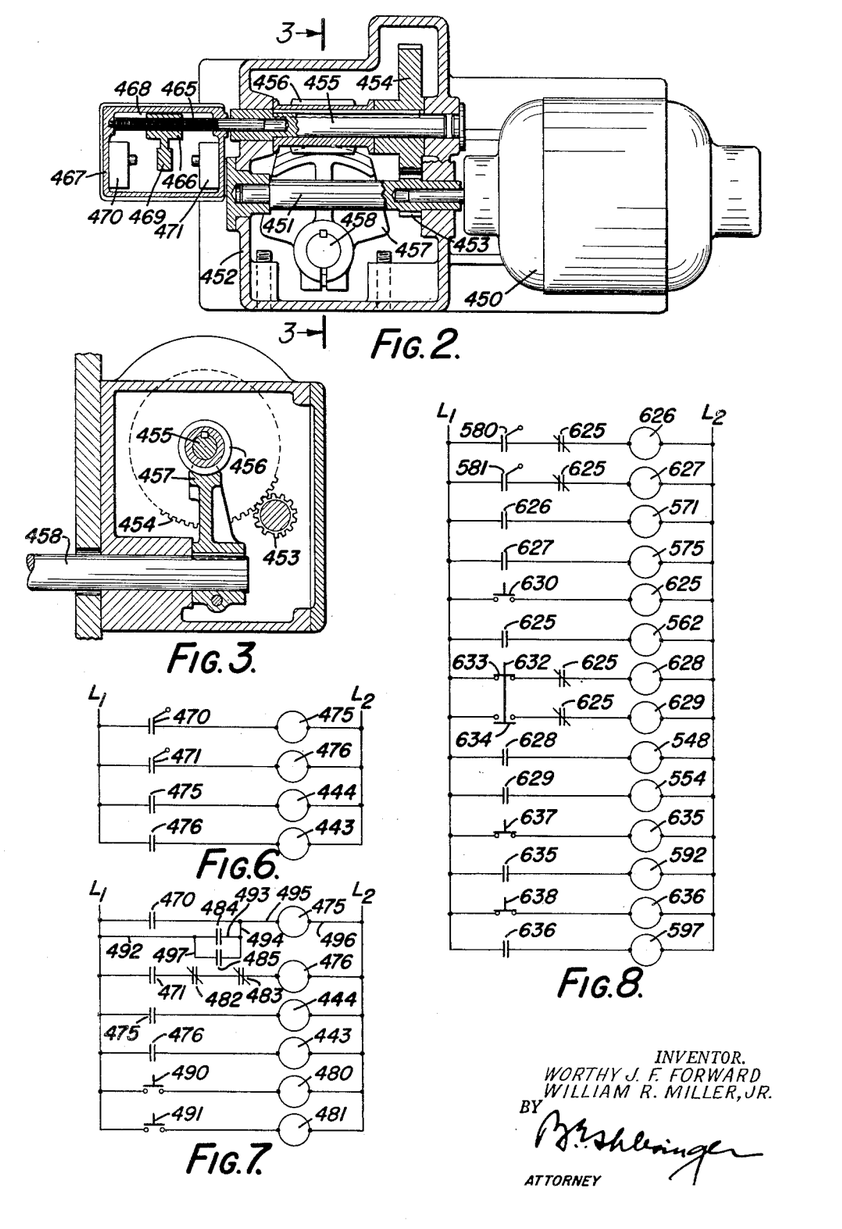
Fig. 2 is a fragmentary section showing the mechanism for shifting the speed change gears in the drive to the work spindle of the lathe and showing also the means for interlocking this shifting mechanism with the means for shifting the feed change gears.
Fig. 3 is a fragmentary section on the line 3—3 of Fig. 2 looking in the direction of the arrows.
Fig. 6 is an electrical wiring diagram showing one way in which either a lathe or a boring mill may be wired to achieve the purpose of the present invention.
Fig. 7 is an electrical wiring diagram showing how the lathe may be wired where a high speed traversing mechanism is employed.
Fig. 8 is an electrical wiring diagram showing one way in which a boring mill may be wired to function according to the present invention.

Secured to the shaft 455 to rotate therewith is a screw shaft 465 (Fig. 2). This shaft threads into a nut 466 which is held against rotation as by means of a lug that engages in a longitudinal groove formed in the housing 467 and extending parallel to shaft 465. The nut 466 has a lug 469 integral therewith that is adapted at opposite ends of the travel of the nut to trip limit switches 470 and 471, respectively.

These limit switches 470 and 471 are wired to the clutch solenoids 444 and 443, respectively, as illustrated diagrammatically in Fig. 6. $L_1$ and $L_2$ are the main lines. When limit switch 470 is closed, a relay 475 is activated to energize clutch solenoid 444 (Figs. 1 and 4) and shift the feed drive to high. When limit switch 471 is closed, relay 476 is activated to energize clutch solenoid 443 and engage clutch 433 to causes the change gears 31, 431 to drive the shaft 272 at the low rate of feed. Thus, when the high speed drive (85—89) to the work spindle is engaged, the fast feed clutch 434 is engaged in the feed drive automatically and simultaneously, and when the low speed drive (85—88—92—93) to the work spindle is engaged the slow feed clutch 433 is engaged in the feed drive automatically and simultaneously.

It is desirable, where the variable speed motor 225 is used for rapid traverse as well as for feed, that means be provided for engaging the fast feed clutch 444 while traversing, and independently of the setting of the clutches in the drive to the work spindle. This can be accomplished by wiring the machine as illustrated diagrammatically, for instance, in Fig. 7.

The main lines are again denoted at $L_1$ and $L_2$. In this case two additional relays 480 and 481 are provided. The relay 48 comprises a normally closed contact 482 and a normally open contact 484. The relay 481 comprises a normally closed contact 483 and a normally open contact 485. A push button 490 is provided to close the circuit to the motor 225 for forward high speed traverse of the carriage or cross-slide; and a push button 491 is provided to close the circuit to the motor 225 for high-speed traverse in the reverse direction of the carriage or cross slide.

Regardless of the positions of the limit switches 470 and 471, when the rapid traverse push button 490 is closed, the relay 480 is energized to close the contact 484 and open the contact 482. The closing of the contact 484 makes a circuit from the main line $L_1$ through the line 492, contact 484, line 493, line 494, line 495, relay 475, and line 496 to the main line $L_2$. Thus, regardless of whether the limit switch 470 is closed or open, the relay 475 will be activated to energize the clutch solenoid 444 to cause the drive shaft 272 to rotate at high speed.

Likewise, when the push button 491 is closed, the relay 481 is energized to open the contact 483 and close the contact 485. The opening of the contact 483 breaks the circuit to the relay 476 and to the low speed solenoid clutch 443, if that clutch happens to be engaged; and the closing of the relay contact 485 insures a circuit to the relay 475 that actuates the solenoid clutch 444 regardless of whether the limit switch 470 is closed or open. This circuit is from the main line $L_1$ through the lines 492, and 497, contact 485, lines 494 and 495, relay 475, and line 496 to main line $L_2$. Thus, the high ratio feed clutch 444 is always engaged while traversing regardless of the position of pinion 85 (Fig. 1) and without disturbing the positions of the limit switches 470 and 471. The push buttons 490 and 491 are normally open push buttons and therefore the high speed traverse occurs only while one or the other of these buttons is held closed. Moreover, when whichever of these push buttons has been employed is released, the limit switch 470 or 471, which has previously been engaged, takes over control of the feed rate change gear setting.

Preferably the work drive motor 80, like the feed motor 225, is a variable speed motor. Each of these motors may have a separate conventional control for adjusting its speed. These two controls permit of separate adjustment of the work speed and tool feed. Thus, the motor 225 may have several gradations of speed for a gradation of speed of the motor 80 thereby better to control the fineness of feed and thickness of chip. In addition to their individual speed controls in the present machine the two variable speed motors 80 and 225 are connected to a common control and reverse box 486, motor 80 being connected to this box by leads 488 and motor 225 being connected to this box by leads 489. This box, which may be of known construction, functions to change the speed of the feed motor 225 upon change in speed of work motor 80 and to the same extent, that is, to change the feed motor's speed a number of gradations equal to the amount of change of speed of the work motor, thereby to insure maintenance of chip thickness. This box also functions to reverse motor 225 upon reversal of motor 80. By connecting the variable speed motors 225 and 80 together then so that when change in speed of motor 80 is made, motor 225 will automatically be adjusted to a corresponding change in speed, and by connecting the mechanism for shifting speed change gears 85 to the mechanism 443—444 for shifting the feed change gears, it will be seen that when a change is made in speed of work rotation a proper, corresponding change is made in the rate of feed.

Figure 5:
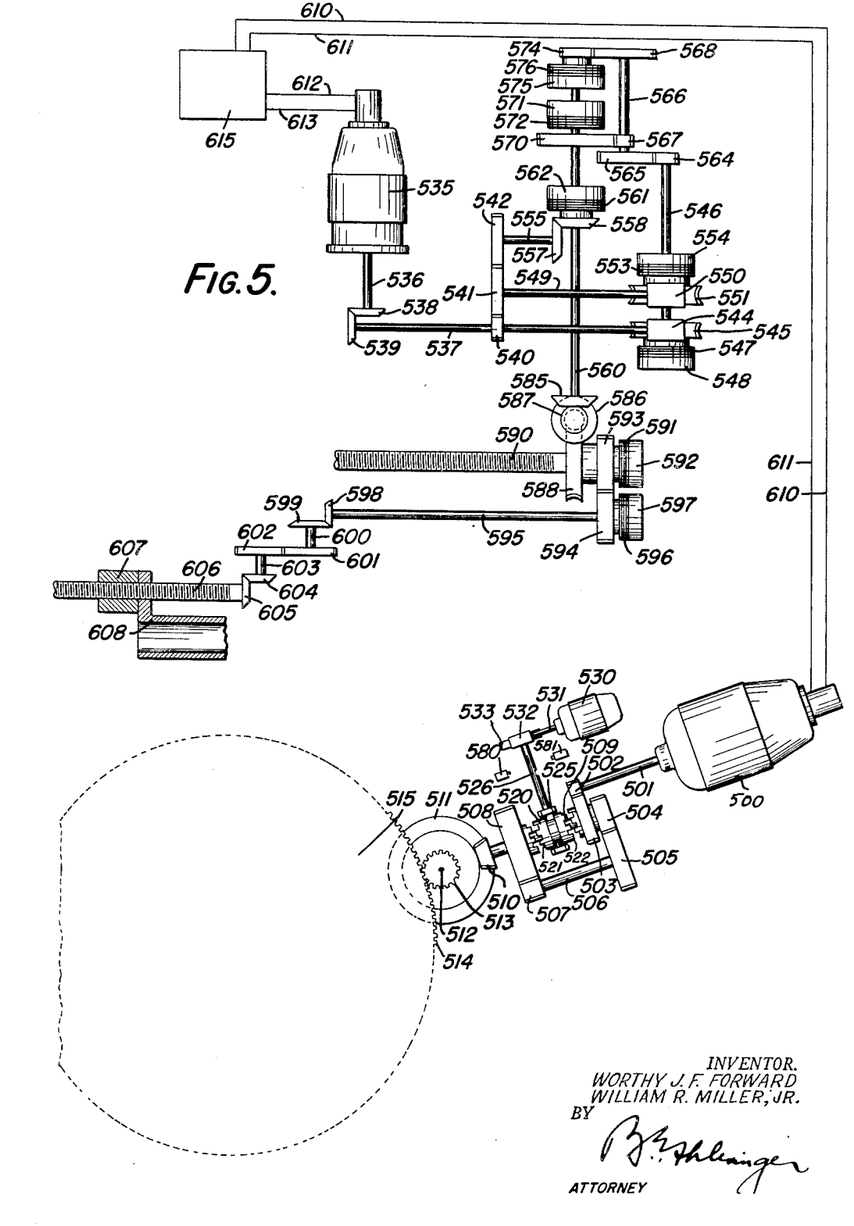
Fig. 5 is a fragmentary drive diagram showing how the present invention may be applied in the drive of a conventional boring mill which has separate feed and work drive motors.

The present invention is not confined to use on lathes. It may be employed on boring mills and other types of machine tools. Fig. 5 is a diagrammatic view showing a drive diagram of a boring mill having means constructed according to the present invention for automatically shifting the feed rate from fast to slow on shift of the speed of rotation of the work from high to low, and vice-versa.

Here the motor for driving the work table is denoted at 500. The armature shaft 501 of this motor carries a pinion 502 which meshes with a spur gear 503 that is integral with a spur pinion 504. The pinion 504 meshes with a spur gear 505 that is secured to one end of a shaft 506. The other end of this shaft has a pinion 507 secured to it which meshes with a gear 508 that is secured to a shaft 509 on which gears 503, 504 and 508 are journaled. This shaft 509 carries a bevel pinion 510 which meshes with a bevel gear 511. This gear is secured to a shaft whose axis is denoted at 512. This shaft has a pinion 513 secured to it which meshes with the gear 514 that is secured to the work table 515 of the machine.

Mounted between the gears 503 and 508 and slidable on the shaft 509 but keyed thereto is a sleeve 520 which is formed at opposite ends with face clutch teeth 521 and 522 that are adapted to engage opposed face clutch teeth on the hubs of the gears 508 and 503, respectively. The clutch member 520 is adapted to be shifted by a yoke member 525 which is actuated on rotation in one direction or the other of a shaft 526. The yoke may form part of a lever that is rigidly secured to this shaft. The shaft 526 is adapted to be rotated by a torque motor 530 whose armature shaft 531 carries a worm 532 that meshes with a worm wheel 533 which is secured to the shaft 526. The motor 530 is reversible and by rotating it in one direction or the other either the clutch 521 or the clutch 522 may be engaged. When the clutch 522 is engaged, the gear 503 is connected directly to the shaft 509 and the work table 515 is driven at high speed. When the clutch 521 is engaged the work table is driven from the motor 500 through the gearing 502, 503, 504, 505, 507, 508, 510, 511, 513, and 514 at low speed.

The feed of the tool, which may be either horizontal or vertical, is effected from the variable speed motor 535. The armature shaft 536 of this motor drives a shaft 537 through a pair of bevel mitre gears 538 and 539. The shaft 537 has a spur pinion 540 secured to it which meshes with a spur gear 541 which in turn meshes with a spur gear 542. The shaft 537 also has a worm 544 secured to it which meshes with a worm wheel 545. The worm wheel 545 is rotatable on a shaft 546 but may be clutched to that shaft to drive that shaft by a disc clutch 547 which may be solenoid-operated if desired.

The spur gear 541 is secured to one end of a shaft 549 parallel to shaft 537. A worm 550 is secured to the other end of this shaft; and this worm meshes with a worm wheel 551. The worm wheel 551 is also rotatably mounted on the shaft 546 and may be clutched to that shaft to drive that shaft by a disc clutch 553 which may be actuated by solenoid 554.

The spur gear 542 is secured to one end of a shaft 555, which is parallel to the shafts 537 and 549. There is a bevel mitre gear 557 secured to the other end of this shaft which meshes with a bevel mitre gear 558 that is freely rotatable on a shaft 560. The mitre gear 558 may be clutched to the shaft 560 to drive the same by actuation of a disc clutch 561 which may be solenoid operated by a solenoid 562.

The shaft 546 has a spur pinion 564 secured to it which meshes with a spur gear 565 that is secured to a shaft 566. There are also a spur pinion 567 and a spur gear 568 secured to the shaft 566. The pinion 567 meshes with a spur gear 570 which is freely rotatable on the shaft 560 and which may be clutched thereto by actuation of a solenoid 571 which operates a disc clutch 572. The spur gear 568 meshes with a spur pinion 574 which is freely rotatable on the shaft 560 and which may be clutched to that shaft to drive that shaft by operation of a solenoid 575 which operates a disc clutch 576.

When the clutch 547 is engaged and the clutches 553 and 561 are disengaged the shaft 546 is driven from the motor 535 through the gearing 538, 539, 544 and 545. When the clutch 553 is engaged and the clutches 547 and 561 are disengaged, the shaft 546 will be driven from the motor 535 through the gearing 538, 539, 540, 541, 550 and 551 at a different speed from the speed of rotation when the clutch 547 is engaged.

The rotation of the shaft 526 in opposite directions is arranged through a mechanism, such as that shown in Figs. 2 and 3, to close one or other of two limit switches 580 and 581. These limit switches are wired to the solenoids 571 and 575 in a manner similar to the wiring illustrated in Figs. 6 and 7. Hence, when the clutch member 520 is shifted to the left to engage the gear 508 to drive the table at low speed, the solenoid 571 will be energized to engage the clutch 572 to cause the shaft 560 to be driven at low speed from the shaft 546 through the gears 564, 565, 567 and 570. When on the contrary the clutch member 520 is shifted to the right to engage the gear 503 to drive the table 515 at high speed, the limit switch 580 will be closed to cause the solenoid 575 to be energized to engage the clutch 576 and cause the shaft 560 to be driven at high speed from the shaft 546 through the gears 564, 565, 568 and 574. Preferably the ratio of change in the feed drive gears, that is, the ratio of the drive through gears 567, 570 and the drive through gears 568, 574 should be the ratio of change in the table drive gears, that is the ratio of the drive through gears 502, 503, 504, 505, 507, 508 and the drive through gears 502, 503. The electrical connections between the limit switches 580 and 581 and the solenoids 571 and 575 may be similar to that illustrated in Fig. 6.

When the clutch 561 is engaged, the shaft 560 is driven from the motor 535 through the gearing 538, 539, 540, 541, 542, 557 and 558. This is the rapid traverse drive; and the solenoid 562, which operates the clutch 561, may be wired to the limit switches 580 and 581 in a manner similar to that in which the rapid traverse is wired in Fig. 7.

The shaft 560 operates the feed mechanism. This shaft has a bevel gear 585 secured to it which meshes with a bevel mitre gear 586 that is secured to a shaft to which there is fastened a worm 587. The worm 587 meshes with a worm wheel 588. This worm wheel is rotatable on a screw shaft 590 and may be clutched to that shaft by a disc clutch 591. This disc clutch may be operated in any suitable manner as by means of a solenoid 592 under push button control. When the clutch 591 is engaged the worm gear 588 is coupled to the screw shaft 590 to transmit power to that shaft. The screw shaft is the saddle screw of the boring mill and is adapted to impart horizontal feed movement to the tool.

Integral with the worm wheel 588 is a spur gear 593 which meshes with a spur gear 594 that is rotatable upon a shaft 595. The gear 594 may be coupled to the shaft 595 by a disc clutch 596 which may be operated in any suitable manner as by means of a solenoid 597. Secured to the shaft 595 is a bevel pinion 598 which meshes with a bevel gear 599 that is secured to one end of a shaft 600. The shaft 600 also carries a spur gear 601 which meshes with a spur gear 602 that is secured to one end of a shaft 603. A bevel mitre gear 604 is secured to the other end of the shaft 603. This gear meshes with a bevel mitre gear 605 that is secured to the screw shaft 606. The screw shaft 606 threads into a nut 607 that is fastened to the tool slide 608 of the machine to impart vertical feed movement to the tool.

The motors 500 and 535 may have separate individual controls for speed but they are also connected by lines 610 and 611 and 612 and 613, respectively, to a conventional electrical control and reverse box 615. This control box insures that when the speed of table drive motor 500 is adjusted, simultaneously a corresponding proportional adjustment will be made in speed of feed drive motor 535. The control box also insures that when the table drive motor 500 is reversed feed motor 535 will be simultaneously reversed.

The two clutches 591 and 596 may be manually engaged and disengaged through a suitable leverage, or they may be electrically engaged and disengaged by operation of solenoids 592 and 597 through manual operation of a push button (not shown). The clutch 547 is intended to engage the coarse feed drive and the clutch 553 is intended to engage the fine feed drive. The clutch 561 is for rapid traverse. As previously stated, the clutches 572 and 576, are operated by the solenoids 571 and 575, respectively, under control of the limit switches 580 and 581 which are actuated by shift of the work speed-control clutch 520. Preferably the two clutch solenoids 548 and 554 are connected with the two clutch solenoids 571 and 575 in a manner similar to that disclosed in Fig. 6 so that when the solenoid 562, which operates the rapid traverse clutch 561 is energized, the solenoids 548, 554, 571, and 575 will be deenergized, so that the feed movement whether horizontal or vertical may be effective at the high speed required for rapid traverse.

One way in which the machine of Fig. 5 may be wired to accomplish its purpose is illustrated diagrammatically in Fig. 8. Here 625 denotes the relay for operating the solenoid 562 which actuates the rapid traverse clutch 561. This relay is provided with a plurality of switch arms, one of which is incorporated in the circuit from limit switch 580 to the relay 626 that operates the solenoid 571 which actuates clutch 572. Another arm of relay 625 is incorporated in the circuit from limit switch 581 to the relay 627 which controls the solenoid 575 that actuates the clutch 576. Other arms of relay 625 are incorporated in the circuits to the relays 628 and 629 which control, respectively, the solenoids 548 and 554 which actuate the clutches 547 and 553, respectively. The arm of the relay 625 which is incorporated in the circuit to solenoid 562 is normally open; the other arms of this relay 625 are normally closed. When the push button 630 is pushed in, therefore, solenoid 562 will be energized and the circuits to the other solenoid 571, 575, 548 and 554 will be deenergized. A push button 632 having two contact bars 633 and 634 may be provided to control the relays 628 and 629 which control the solenoids 548 and 554. The push button 632 is constructed so that when contact is made by the bar 633, it will be broken at the bar 634 and vice versa. Relays 635 and 636 which control solenoids 592 and 597, respectively, that operate clutches 591 and 596, respectively may be operated by push buttons 637 and 638 or in any other desired manner. Preferably push buttons 637 and 638 are connected so that when one is opened the other is closed.

Ordinarily, boring mills are built with a single table drive but employ at least two tools. They may be built, too, with side heads carrying extra tools, and may also be built to have a double table drive. When the present invention is applied to a large size boring mill having a double table drive, the clutch operating mechanism illustrated in Fig. 5 can be duplicated to provide the desired dual table drive with connection to the feed mechanism.

While a torque motor (450, 530) has been described for shifting the clutches in the work drive both of the lathe and of the boring mill, it is obvious that any other motive means may be employed such as a pneumatic or hydraulically actuated piston and cylinder. At the end of its stroke in either direction the piston, if used, will trip one or other of the two limit switches which control, respectively, the two solenoids that engage, respectively, the high and low ratio clutches in the feed drive.

In either the lathe or the boring mill described it will be seen that even though the feed mechanism be driven by a separate motor independently of the motor that drives the work spindle, when the work spindle drive is shifted from fast to slow speed, simultaneously and automatically the feed will be shifted from high to low rate, and vice versa. The thickness of the chip taken by the cutting tool may be maintained despite change in the speed of rotation of the work spindle. This is important on large lathes and boring mills to avoid taking too heavy a cut especially when the work spindle speed is reduced. The tool will not take too thick a cut at any time; and the tool will, therefore, be protected from breakage.

While different embodiments of the invention have been described, it will be understood that the invention is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described our invention, what we claim is:

1. In a machine tool, a rotary work support, a tool support, a motor, means for driving said work support from said motor at high speed, means for driving said work support from said motor at low speed, a shiftable member for selectively coupling either of said two drive means between the motor and the work support and for simultaneously uncoupling the other drive means therefrom, means for effecting a relative feed movement between said work support and said tool support and comprising a second motor, a train of gearing connecting said second motor with said feed means and including a set of gearing for driving said feed means at one rate of speed, a second set of gearing for driving said feed means at a different rate of speed, a set of change gears for fast feed and a separate set of change gears for slow feed, and two clutches for connecting, respectively, the two sets of change gears in said gear train, two electromagnets for actuating said two clutches, and two limit switches for closing, respectively, electrical circuits to said elecromagnets, said two limit switches being mounted in spaced relation to one another and in the operative path of movement of said shiftable member to be operated by said shiftable member at separated points, respectively, in the movement of said shiftable member.

2. In a machine tool, a rotary work support, a tool support, a motor, means for driving said work support from said motor at high speed, means for driving said work support from said motor at low speed, a shiftable member for selectively coupling either of said two drive means between said motor and the work support and for simultaneously uncoupling the other drive means therefrom, feed means for moving one of said supports relative to the other to effect a relative feed movement between said supports, a second motor, a train of gearing, a plurality of sets of change gears selectively connectable to said train, two other sets of change gears selectively connectable to said train of gearing and adapted to drive said feed means at a fast rate and at a slow rate, respectively, a plurality of clutches for connecting said plurality of selectively connectable change gears, respectively, in said train of gearing, a plurality of solenoids for actuating said clutches, two clutches for connecting, respectively, said two other sets of change gears to said train, two solenoids for actuating, respectively, the two last-named clutches, two limit switches for closing, respectively, electrical circuits to said two last-named solenoids, means for closing electrical circuits to the other solenoids, said two limit switches being disposed, respectively, to be operated by said shiftable member at opposite ends of its movement, respectively, and means for actuating said second motor to effect rapid traverse of said movable support in either direction, and means operable on actuation of said second motor for rapid traverse to short circuit the limit switch for the solenoid that actuates the clutch for the fast feed change gears, to simultaneously close an electrical circuit to the fast feed solenoid, and to simultaneously break the electrical circuits to all the other solenoids.

3. In a lathe, a rotary work spindle, a reciprocable tool carriage, a motor and selectively connectable change gears for driving the work spindle at high speed and at low speed, respectively, means for reciprocating said carriage including a nut secured to said carriage, a feed screw threadably engaging said nut, and gearing for driving said feed screw in timed relation with the rotation of said work spindle, separate means for reciprocating said carriage comprising a relatively fixed rack, a pinion meshing with said rack and journaled in said carriage, a second motor, a train of gearing including selectively connectable change gears for driving said pinion to impart fast and slow feed movements, respectively, to said carriage, means for selectively coupling said two reciprocating means to said carriage, shiftable means for selectively connecting the high and low speed gears in the drive to the work spindle, two clutches for selectively connecting the fast and slow feed change gears in the drive to said pinion, two solenoids for selectively actuating said two clutches, and two limit switches operable at opposite ends of the movement of said shiftable means, respectively, to close electrical circuits to said two solenoids, whereby when said separate reciprocating means is connected to said carriage and when the low speed change gears are engaged in the drive to the work spindle the slow feed change gears are engaged in the drive to said pinion, and vice versa when the high speed change gears are engaged in the drive to the work spindle the fast feed change gears are engaged in the drive to said pinion.

4. In a boring mill, a rotary work table, a reciprocable tool carriage, a motor and selectively connectable change gears for driving said table at high speed and at low speed, respectively, separate means for actuating said carriage comprising a screw, a second motor, a train of gearing including selectively connectable change gears for driving said screw to impart fast and slow feed movements, respectively, to said carriage, shiftable means for selectively connecting the high and low speed change gears in the drive to said table, a pair of clutches for selectively connecting the fast and slow feed change gears in the drive to said screw, two solenoids for selectively actuating the two clutches, and two limit switches operable at opposite ends, respectively, of the movement of said shiftable means to close electrical circuits to said two solenoids, whereby when the low speed change gears are engaged in the drive to the work spindle the slow feed change gears are engaged in the drive to said screw, and vice versa when the high speed change gears are engaged in the drive to the work spindle the fast feed change gears are engaged in the drive to said screw.

5. In a machine tool, a rotary work support, a tool support, means for driving the work support comprising a variable speed motor and a train of gearing operatively connecting said motor to said work support, said train of gearing including selectively couplable change gears for driving the work support from said motor selectively at high speed and at low speed, means for effecting a relative feed movement between the tool support and the work support during rotation of the work support comprising a second variable speed motor, and a train of gearing for operatively connecting said second motor to said feed means, said second train of gearing including change gears for the fast feed and separate change gears for the slow feed, and two clutches for connecting, respectively, the fast feed and the slow feed change gears in said second train of gearing, two solenoids for actuating said two clutches, a reciprocable shiftable member for selectively coupling the high speed and low speed change gears in the first-named train of gearing, two limit switches for closing, respectively, electrical circuits to said solenoids, said two limit switches being disposed to be operated by said shiftable member at opposite ends, respectively, of its movement, whereby the slow feed change gears are engaged in said second train of gearing upon engagement of the low speed change gears in said first-named train of gearing and said fast feed change gears are engaged in said second train of gearing upon engagement of the high speed change gears in said first-named train of gearing, and a manually operable controller to which both said variable speed motors are connected electrically and operable to vary the speed of the second motor upon variation in speed of the first motor in the proportion to maintain the prior ratio of speeds of the two motors.

References Cited in the file of this patent

UNITED STATES PATENTS

| | | |
|---|---|---|
| 1,527,637 | Fick | Feb. 24, 1925 |
| 1,542,483 | Stephenson | June 16, 1925 |
| 2,036,821 | Munson | Apr. 7, 1936 |
| 2,140,565 | Svenson | Dec. 20, 1938 |
| 2,363,934 | Bennett | Nov. 28, 1944 |
| 2,367,064 | Shoemaker et al. | Jan. 9, 1945 |
| 2,401,164 | King et al. | May 28, 1946 |
| 2,469,269 | Lear | May 3, 1949 |
| 2,488,412 | King et al. | Nov. 15, 1949 |
| 2,498,272 | Herchenroeder | Feb. 21, 1950 |
| 2,546,913 | Trosch et al. | Mar. 27, 1951 |

FOREIGN PATENTS

| | | |
|---|---|---|
| 240,725 | Great Britain | Oct. 8, 1925 |
| 247,147 | Switzerland | Nov. 17, 1947 |